United States Patent [19]

Kendall et al.

[11] Patent Number: 4,933,939
[45] Date of Patent: Jun. 12, 1990

[54] METHOD AND APPARATUS FOR ERROR MEASUREMENT AND REDUCTION IN A MASS STORAGE DEVICE MEMORY SYSTEM

[75] Inventors: Larry J. Kendall, San Jose; Andrew Palfreyman, Sunnyvale, both of Calif.

[73] Assignee: National Semiconductor Corporation, Santa Clara, Calif.

[21] Appl. No.: 276,209

[22] Filed: Nov. 23, 1988

[51] Int. Cl.$^5$ .............................................. G06F 11/00
[52] U.S. Cl. ....................................... 371/5.5; 371/28
[58] Field of Search ................... 371/28, 5.5, 5.1, 5.2, 371/5.3, 5.4, 30; 360/31, 53

[56] References Cited

U.S. PATENT DOCUMENTS

| | | | |
|---|---|---|---|
| 4,480,274 | 10/1984 | Coleman | 360/31 |
| 4,788,696 | 11/1988 | Sakane | 371/5.4 X |
| 4,821,125 | 4/1989 | Christensen | 360/31 |
| 4,841,526 | 6/1989 | Wilson | 371/5.5 X |

OTHER PUBLICATIONS

G. Robinson, "Knowing Error Sources Lets You Evaluate Hard-Disk Drives," EDN, Feb. 5, 1987, pp. 165–170.
"Solving the Test Problem in SCSI Disk Drives," Electronics, Feb. 17, 1986, pp. 35–37.
"Update: Flexstar's SCSI Tester Gets High Marks," Electronics, Feb. 19, 1987, p. 76.
"A Special Report: the TAGI Disk Test Conference," Differential Copy, Nov., 1986, pp. 5–17.
"DP8469 Synchronizer/ 2,7 ENDEC," Distributed by National Semiconductor Corporation, on or before Jun. 12, 1986, twenty-two pages.

*Primary Examiner*—Joseph Ruggiero
*Assistant Examiner*—Robert W. Beausoliel
*Attorney, Agent, or Firm*—Limbach, Limbach & Sutton

[57] ABSTRACT

An error measurement and reduction method, including the steps of inducing a high error rate in a mass storage device memory system to determine rapidly and independently the optimal pattern sensitivity, pulse pairing, and window centering error parameters for the system. In a preferred embodiment, the system error rate is then reduced by setting at least one, and preferably all three, of the error parameters to its optimal value. The inventive system includes means for performing the inventive method, and preferably includes computer-controllable means for independently adjusting the pattern sensitivity and pulse pairing error parameters associated with each read/write head of the system, and for adjusting the window centering error parameter associated with the system. The inventive method and system exploit the mutual orthogonality (with respect to overall system error rate) of the pattern sensitivity pulse pairing, and window centering error parameters, which mutual orthogonality exists when the system reads selected test patterns.

34 Claims, 14 Drawing Sheets

METHOD AND APPARATUS FOR ERROR MEASUREMENT AND REDUCTION IN A MASS STORAGE DEVICE MEMORY SYSTEM

FIELD OF THE INVENTION

The invention relates to methods and apparatus for measuring and reducing the error rate of a mass storage device memory system. More particularly, the invention relates to methods and apparatus for measuring and reducing the error rate due to window centering, pulse pairing, and pattern sensitivity in a mass storage device memory system.

BACKGROUND OF THE INVENTION

To understand the invention, it is necessary to appreciate the nature of three types of errors that occur in operation of mass storage devices, such as disk and tape drive memory systems. For specificity, much of the following discussion will refer to magnetic disk drive systems. However, it will be apparent that the discussion may readily be generalized to apply to the operation of other mass storage devices such as optical disk drive systems and magnetic tape drive systems.

FIG. 1 is a block diagram of a conventional magnetic disk drive system. Disk 1 includes a number of concentric tracks such as track 2. Magnetic read/write head 3 is separated by a small distance (typically about 0.00001 inches) from track 2, so that head 3 can read data from track 2 as disk 1 rotates relative to head 3. The analog signal read by head 3 is amplified in read pre-amplifier 4 and supplied to pulse peak detector 5. Pulse detector 5 differentiates the analog signal, and generates a digital signal whose pulses have leading edges corresponding to the zero-crossing points of the differentiated analog signal which correspond to the peaks and troughs of the incoming analog signal. Alternatively, unit 5 may be any circuit which generates a digital signal whose leading edges correspond to the peaks and troughs of the incoming signal.

The digital signal emerging from unit 5 is then synchronized with a phase-locked VCO clock signal in synchronizer 7 to eliminate jitter, and is supplied to decoder 8 where it is converted to serial NRZ format suitable for processing in controller 9.

NRZ digital data to be written on disk 1 by head 3 is encoded into a desired format such as the well-known 2,7 RLL (Run Length Limited) code format in encoder unit 10. In 2,7 RLL code, each bit representing a "one" is preceded and followed by a minimum of two zeros and a maximum of seven zeros. The encoded data then undergoes precompensation in circuit 6 and is supplied to write driver 11, which generates appropriate signals to cause drive head 3 to write the data on disk 1. Selection element 12 performs the function of selecting one of the read/write heads (in an embodiment including two or more independently selectable heads), selecting either a Read or Write mode, and (in the Write mode) supplying the proper write current to the head selected to write data onto disk 1.

Precompensation circuit 6 compensates for bit shift due to the tendency of closely spaced pulses to "repel" one another. This tendency causes two pulses written with minimum separation to be read back with more than one half the separation of two bits written with twice the minimum separation. Circuit 6 detects patterns (in the digital signal emerging from encoder 10) likely to exhibit such pattern-sensitive bit shifting. Then, while delaying the bits not selected by a nominal amount, circuit 6 delays the selected bits by more than a nominal amount (i.e., those selected bits likely to be "Early") or by less than a nominal amount (i.e., those selected bits likely to be "Late").

The above mentioned pattern sensitivity phenomenon (the repulsion between adjacent bits) is a significant source of error in reading from and writing onto a mass storage device (such as a disk or tape drive memory system). The phenomenon is most pronounced at highest recorded bit densities, and accordingly varies in magnitude from track to track on a disk, having maximum magnitude for the track having minimum radius. The phenomenon also varies with other parameters such as head variations, media variations, and head to media spacing. Thus, it is desirable to perform precompensation and precompensation recalibration for each disk drive read/write head, or each disk surface, or both.

However, there are two other significant sources of error in reading from and writing onto a mass storage device, namely window centering error and pulse pairing error. It is possible to define a parameter representing the contribution of each of pattern sensitivity error, window centering error, and pulse pairing error to the overall system error rate.

Window centering error is most readily characterized by the averaged time difference between the leading edge of each data pulse entering synchronizer 7 and the leading edge of each phase-locked VCO clock pulse. The leading edge of the data pulses will ideally be positioned in time at the exact center of a time "window" defined by adjacent clock pulse leading edges. The data will be strobed out (as "Sync Data") by the "Clock" leading edge following the "Data" leading edge. Positioning the average "Data" leading edge at the exact center of the "window" allows any specific data pulse to be shifted forward or back by up to one half the window period and still be strobed out by the proper (next) clock pulse. Increasing the average time separation between the clock edges and the data pulse centers will decrease the overall system error rate. Typically, the "window center" can be adjusted by varying the relative delays of the Data pulse leading edges and the clock pulse leading edges. Window centering error is purely a function of the accuracy of the Data and Clock relative delays in the synchronizer, and accordingly the operation of window centering need only be performed once for each drive employing multiple heads (not once for each read/write head).

Synchronizer 7 of the FIG. 1 system includes delay circuit 7a for shifting the phase of the phase-locked VCO clock pulses generated therein relative to the received Data pulse leading edges. It is conventional for the phase shift produced by delay circuit 7a to be variable in response to control signals supplied from controller 9 on line $C_1$. Thus, the contribution of window centering error to the overall system error rate may be varied by such control signals on line $C_1$.

Pulse pairing error results from the asymmetry between positive and negative flux transitions, which may be induced anywhere in the write-channel and read-channel circuitry. FIG. 2 shows one way in which pulse pairing may arise. Signal (a) has form typical of the amplified output of a magnetic disk drive read/write head, and includes positive polarity pulses 20, 22, and 24 alternating with negative polarity pulses 21, 23, and 25.

Magnets 13-17 comprise part of a sector of track 2 of disk 1 in FIG. 1. Each track of disk 1 includes a plurality of independent sectors. When read/write head 3 is passing over the intersection of magnets 14 and 15, a positive voltage pulse will be induced in head 3, which when amplified will be shaped as positive pulse 22. Similarly, negative pulse 23 corresponds to the signal induced when head 3 is passing over the intersection of magnets 15 and 16.

The average separation between each adjacent pulse is equal to T. Signal (a), after it is differentiated in one of the circuit elements has the waveform of signal (b). The zero-crossings of signal (b) correspond to peaks or troughs of signal (a). Signal (d) represents the ideal output of a circuit for generating a train of pulses whose leading edges align with the zero-crossings of signal (b). In practice, the actual output of such a circuit will likely resemble signal (c), which exhibits pulse pairing. Typically, a circuit intended to generate a stream of digital pulses from signal (b) will produce pulses whose leading edges align, not with zero-crossings of signal portions 30-35, but instead with points of signal (b) having a small amplitude offset as shown in FIG. 2. Thus, the pulses of signal (c) are paired, with alternating long spacing T1 and short spacing T2 between adjacent pulses. Specifically, each pair of adjacent pulses associated with a positive polarity peak followed by a negative polarity peak (i.e., pair of pulses 41 and 42) will have increased separation T1 (where T1 is greater than T) and each pair of adjacent pulses associated with a negative polarity peak followed by a positive polarity peak transition (i.e., pair of pulses 42 and 43) will have decreased separation T2 (where T2 is less than T).

It is conventional to test disk drive systems to measure their error rates (the error rate of a system is the number of bits processed incorrectly by the system divided by the number of bits processed correctly by the system). However, conventional error tests are very time-consuming, commonly requiring on the order of several hours. Such conventional tests have been time-consuming because typical error rates for disk drive systems are extremely low (for example $10^{-10}$), so that statistically significant accumulations of errors requires that many bits of data be read (at typical data rates in the range 5-20 Megabits/sec). Further, a practical, inexpensive method and means for rapidly and independently measuring and varying the error rate for each read/write head (or each storage medium track) has not been developed. Nor has a practical means been developed for independently varying the window centering, pulse pairing, and pattern sensitivity error parameters of a mass storage device memory system.

It would be desirable to perform error measurement tests sufficiently rapidly so that mass storage device users and manufacturers could routinely perform them whenever operating the device. If the users could also rapidly minimize the system error rate in conjunction with each such test, the users could routinely optimize the data integrity of their systems. Device manufacturers could then increase the capacity of such optimizible devices (or reduce their cost without reducing capacity) because the optimizible devices would require less error margin. Because certain contributions to overall system error vary from read/write head to read/write head of a multiple head system (for example, precompensation error and pulse pairing error), it would be desirable if users and manufacturers could rapidly minimize the error rate associated with each read/write head of such a system.

SUMMARY OF THE INVENTION

The inventive method is a rapid error measurement and reduction technique, including the steps of inducing a high mass storage device memory system error rate to determine independently the optimal pattern sensitivity, pulse pairing, and window centering parameters for the system. In a preferred embodiment, the system is tuned by setting one or more of these parameters to its optimal value, so that the contribution of each optimized parameter to the system's overall error rate is minimized. The inventive system includes means for performing the inventive method, and preferably includes computer-controllable means for independently adjusting the pattern sensitivity and pulse pairing error parameters associated with each read/write head of the system, and for adjusting the window centering error parameter associated with the system.

The inventive method exploits the mutual orthogonality (with respect to overall system error rate) of the pattern sensitivity, pulse pairing, and window centering error parameters in the following manner. To determine the optimal value of a first of these parameters, a high system error rate is induced by appropriately setting a second of the parameters. Then, the first parameter is varied around its nominal value until the value which produces a minimum error rate is found. Then, the process is repeated to determine the optimal value of the second parameter by appropriately setting the first (or third) parameter to induce a high overall system error rate and varying the second parameter to locate the value which produces a minimum error rate. Finally, the process is repeated to determine the optimal value of the third parameter by setting the first (or second) parameter to induce a high system error rate and varying the third parameter for minimum error rate. For certain test patterns (to be described herein), the three error parameters are "orthogonal" in the sense that the optimal value of any one of the three parameters does not depend on the values of the other two parameters.

A preferred embodiment of the inventive system includes circuitry for measuring the pulse pairing error parameter and for compensating for pulse pairing error by separately delaying positive and negative polarity signals read from the mass storage device, and adjusting these delays through separate, electronically adjustable delay lines or through a single rapidly adjustable delay line.

DETAILED DESCRIPTION OF THE PREFERRED EMBODIMENTS

We have recognized that the window centering, pulse pairing, and pattern sensitivity error parameters of a mass storage device memory system are mutually orthogonal with respect to the system error rate, subject to the following qualification. The window centering parameter (WC) and the pulse pairing parameter (PP) are always mutually orthogonal. However, WC and the pattern sensitivity parameter (PC) will be mutually orthogonal only for certain test patterns (i.e., for certain sequences of bits read from or to be written onto a memory within the mass storage device). Similarly, PP and PC, the pulse pairing and pattern sensitivity parameters, will be mutually orthogonal only for certain test patterns. The conditions under which WC and PC, and PC and PP will be orthogonal will be explained next.

Figure 3:
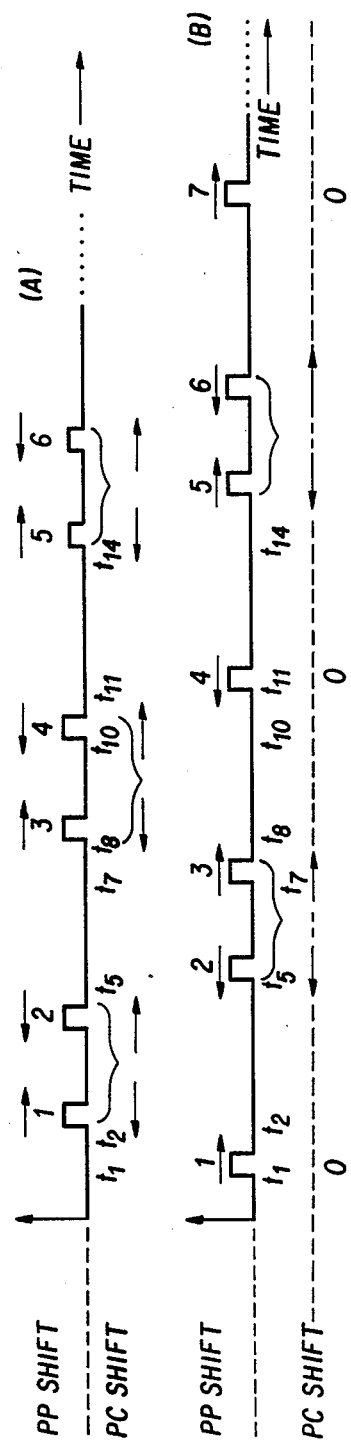
FIG. 3 is a set of two digital pulse trains of the type that may be generated in a magnetic disk drive memory system.

We have recognized that for some test patterns, such as signal (A) of FIG. 3, the error rate due to pulse pairing will depend in a definite manner on the error rate due to the pattern sensitivity (bit repulsion) phenomenon. Adjacent pulses of signal (A) are shifted in alternating directions due to the pulse pairing phenomenon discussed above. Adjacent pulses of signal (A) will repel due to the pattern sensitivity phenomenon. The PP shift and the PC shift are "phase-locked", and one clearly depends on the other. An arbitrary PP phase is shown, which happens to result in the effect that the PP shift tends to cancel the PC shift. However, if the opposite PP phase had been shown, the PP and PC shifts would still have been "phase-locked", although in this latter case one shift would tend to reinforce the other. For signal (A), assuming that the optimal WC and PP error parameters have been determined and one desires to determine the optimal PC error parameter, holding PP fixed and "tuning" PC for minimum overall error rate will produce a different "optimal" value for PC for each different fixed value of PP, so that PC and PP are clearly not orthogonal and are instead, linearly dependent.

In contrast, signal (B) of FIG. 3 exhibits a randomized PP error phase with respect to the PC error phase (i.e., for pulse pair (2,3), the PP shift tends to reinforce the PC shift while for pulse pair (5,6), the PP shift tends to cancel the PC shift). Whatever deviations are made due to PP on pulse pair (2,3) are cancelled exactly on pulse pair (5,6). This will not have the effect of producing a net zero error rate due to PP and PC. Instead, the error rate will be the algebraic mean of the unsigned sum of the two error rates associated with the two different pairs of PP and PC parameters. Thus, for signal (B), the PC value found to produce the lowest error rate will not depend on the value of PP used to induce the high system error rate (to achieve short error rate measurement duration).

Accordingly, in performing an embodiment of the inventive method in which PP is held fixed and PC is varied to determine its optimal value (or in which PC is held fixed and PP is varied to determine its optimal value) a "locked" test pattern such as signal (A) of FIG. 3 should not be employed, and rather, a test pattern such as signal (B) of FIG. 3 (i.e., an "unlocked" pattern exhibiting randomized PP phase relative to PC phase) should be employed.

The preferred "unlocked" test pattern may be precisely characterized with reference to the following model. The model assumes that the system error rate, p, for the quantity, x, has form $p = ax + bx^2$, and that the average error rate, $p_a$, over the sequence cycle (i.e., during variation of one of the error parameters or sequential variation of different ones of the error parameters) is a function of variable error parameters $p_1$ and $p_2$. Thus $p_1 = p_0 + d_1 = a(x_0 + D) + b(x_0 + D)^2$ and $p_2 = p_0 - d_2 = a(x_0 - D) + b(x_0 - D)^2$, where $x_0$ is the unsigned offset from the window center (zero) due to all fixed error parameters, D is the unsigned deviation from $x_0$ due to all variable parameters, and $p_0$ is the system error rate due to all the fixed error parameters (i.e. the system error rate resulting from holding all the variable error parameters fixed). Further, $(p_1 + p_2) = 2p_0 + (d_1 - d_2) = 2(ax_0 + b(x_0)^2 + bD^2)$, so that $(d_1 - d_2) = D^2(d^2p/dx^2)$.

We have recognized that the preferred "unlocked" test patterns for embodiments of the invention in which PP is held fixed and PC is "tuned" for minimum overall error rate (or in which PC is held fixed and PP is "tuned") satisfy the inequality $p_1 > p_0$ (and hence the inequality $d_1 > d_2$) for any value of the "fixed" error parameter (the "fixed" error parameter is PP, when PP is fixed and PC is being tuned). This criterion desirably allows the system operator to have complete freedom to choose any system operating point during performance of the inventive method. The preferred "unlocked" test pattern also satisfies the criterion that the quantity $(d_1 - d_2)$ is maximized.

Signal (B) in FIG. 3 (an RLL pattern) is such a preferred test pattern. The mapping of signal (B) in FIG. 3 to NRZ will depend on the RLL code chosen (i.e., a 1,7 code, a 2,7, code, or some other code) and so is not specified herein. Of course, it will be appreciated that other, more complex "unlocked" test patterns satisfying the specified criteria may be used instead of signal (B) of FIG. 3, especially if difficulties exist in encoding the signal (B) pattern from NRZ.

It is contemplated that the "PC/PP" steps of the inventive method (that is, the steps during which one of PC and PP is held fixed, and the other is varied) may be optimized for different values of the fixed error parameter (i.e., for different bit-pair spacings, when PC is held fixed). However, it is essential that each test pattern employed have a uniform bit-pair spacing, so that the bit-pair spacing remains substantially constant during each performance of the method. It is also contemplated that one test pattern for each read/write head may be fixed on a track of a disk (or, more generally, on a storage location in a mass storage device memory system) so that each test pattern may be read by a different read/write head during performance of the test. The method will preferably be performed independently for each head, using separate hardware for each head.

In performing an embodiment of the inventive method in which PC is held fixed and WC is "tuned" for minimum overall error rate (or in which WC is held fixed and PC is "tuned"), we have recognized that the preferred test patterns satisfy the inequality $p_a > p_0$ (and hence the inequality $d_1 > d_2$) for any value of the "fixed" error parameter (the "fixed" error parameter is WC, when WC is fixed and PC is being tuned), for either a "locked" test pattern such as signal (A) of FIG. 3, or an "unlocked" test pattern such as signal (B) of FIG. 3. This criterion desirably allows the system operator to have complete freedom to choose any system operating point during performance of the inventive method. The preferred "unlocked" test pattern also satisfies the criterion that the quantity $(d_1 - d_2)$ is maximized. either a "locked" test pattern such as signal (A) of FIG. 3, or an "unlocked" test pattern such as signal (B) of FIG. 3 should be employed.

In each embodiment of the inventive method, it is preferred that a regular test pattern be employed, in order to minimize lock jitter.

Figure 4:
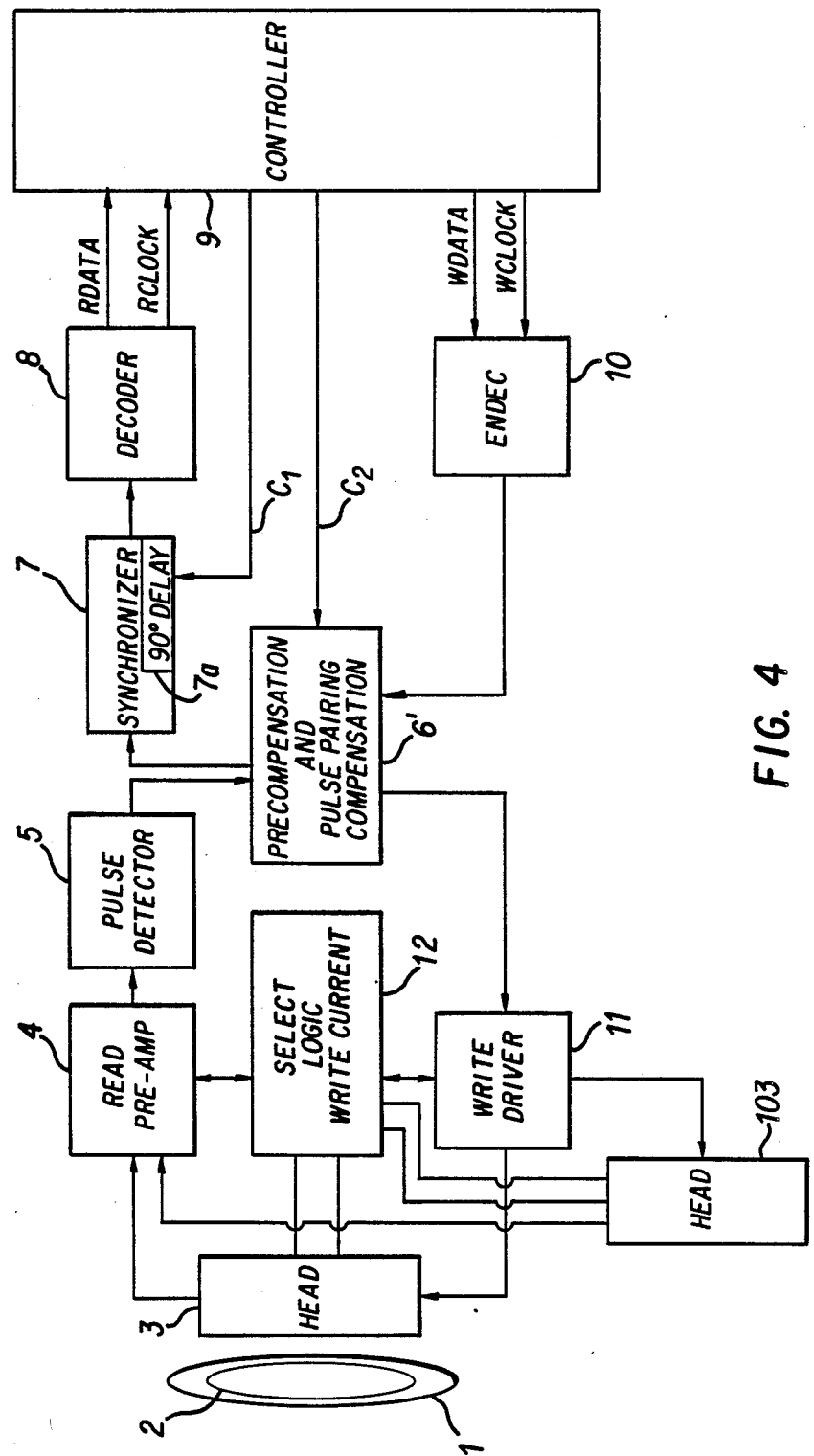
FIG. 4 is a block diagram of a magnetic disk drive system embodying the invention.

The inventive method requires independent variation of a window centering error parameter (WC), a pulse pairing error parameter (PP), and a pattern sensitivity error parameter (PC) associated with a mass storage device memory system. FIG. 4 is a block diagram of a magnetic disk drive system with such capability. The FIG. 4 system includes many of the same elements of the conventional FIG. 1 system, but differs from the FIG. 1 system in the following respects.

Figure 1:
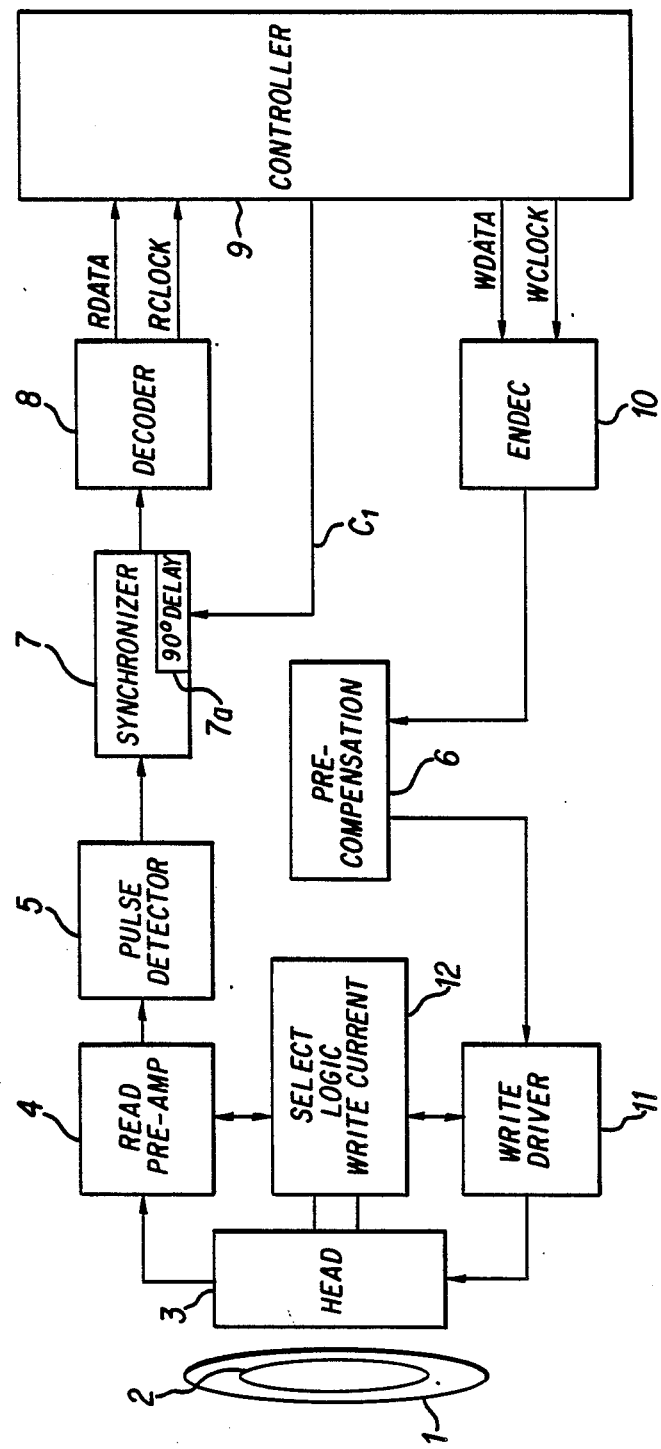
FIG. 1 is a block diagram of a conventional magnetic disk drive system.
Figure 2:
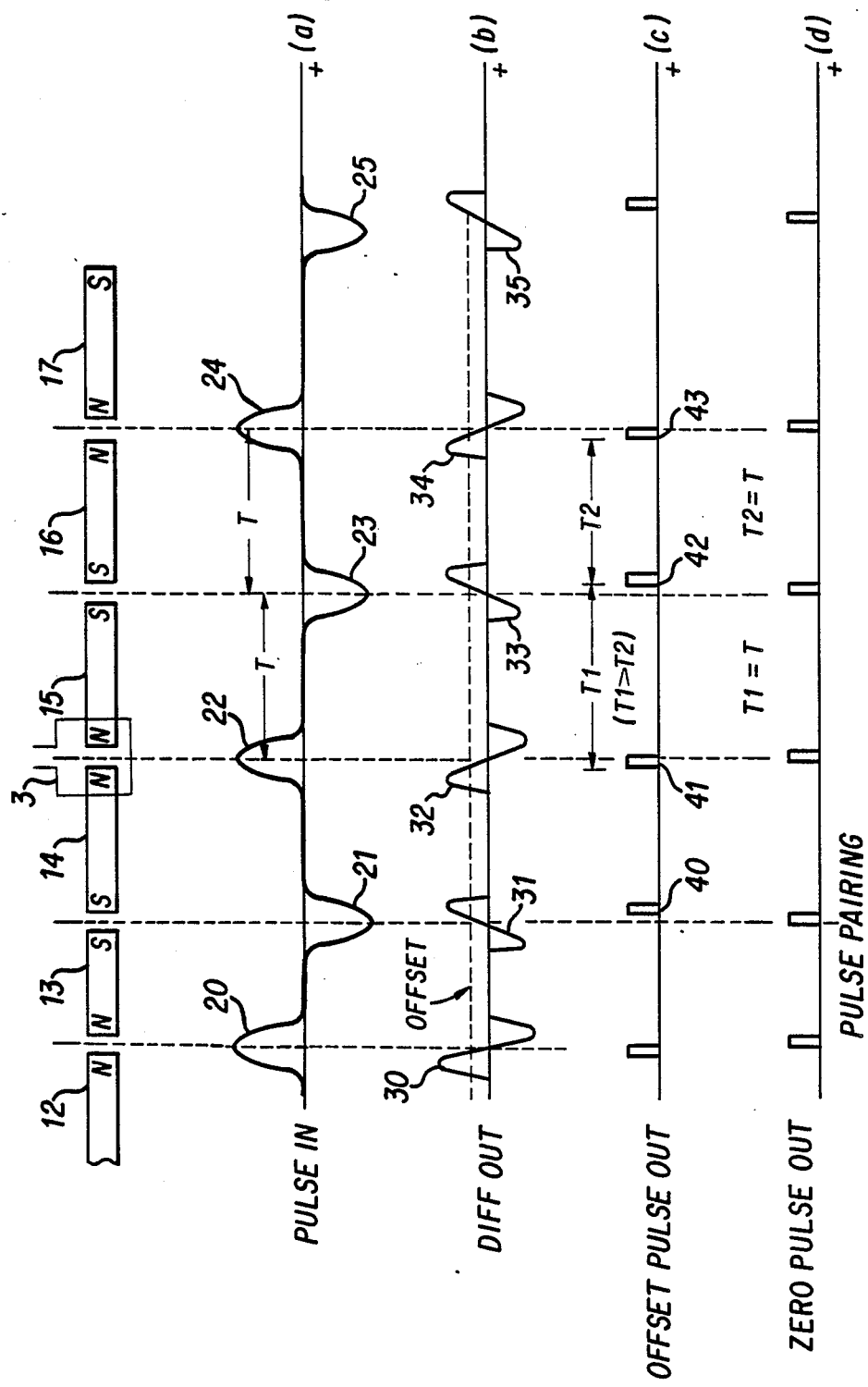
FIG. 2 is a set of four waveforms, waveforms (a), (b), (c), and (d), with distance from the horizontal axis representing voltage and distance from the vertical axis representing time, of the type that might be produced by the FIG. 1 system in its "read" mode.

Circuit 6 of FIG. 1 is replaced by precompensation and pulse pairing compensation circuit 6' in FIG. 4. Circuit 6' will be discussed in detail below with reference to FIGS. 5 through 16. Circuit 6' is capable of independently varying the system's PP and PC error parameters in response to control signals supplied from controller 9 on line C₂. An artificially large overall system error rate may be induced by intentionally changing one of the error parameters away from its optimal value. Then, the optimal value of another of the error parameters may be determined. The overall system error rate may be minimized by sequentially determining the optimal values of the three error parameters and then setting all three of them to their optimal values.

The embodiment of the inventive system shown in FIG. 4 has a second read/write head 103 identical to head 3, which may be positioned to read data from and write data onto a track of disk 1 other than track 2, or a track of a disk (not shown) other than disk 1. Controller 9 is capable of switching circuit 12 to accept data from either head 3 or head 103. Similarly, controller 9 is capable of switching circuit 12 to supply data either to head 3 or head 103. In general, each of heads 3 and 103 will thus be associated with a different PP parameter and with a different PC parameter, which may be independently varied by circuit 6' when head 3 or head 103 are selected respectively.

Although the system shown in FIG. 4 has two read/write heads, systems embodying the invention may alternatively include less than two or more than two read/write heads. Where more than two heads are included, it is contemplated that all will preferably be controlled by a common controller, and will share the same pulse detector, precompensation and pulse pairing correction circuitry, synchronizer, decoder and encoder circuitry.

To perform the inventive method, a high system error rate is induced by appropriately varying a first one of the parameters WC, PP, and PC. The system error rate is then measured for each of a plurality of different values of a second one of the parameters WC, PP, and PC. This is done by generating appropriate control signals in controller 9 to cause the read/write head repeatedly to read the test pattern on the mass storage medium (which may be a magnetic disk as shown in FIG. 4), while the controller sends control signals at appropriate intervals to change the value of the "second" parameter, and while the error rate is computed in the controller (or in a computer interfaced therewith) during each interval in which the second parameter remains unchanged. The optimal value of this second parameter is identified as the value resulting in the lowest overall system error rate. Then, the process is repeated to determine the optimal value of the first parameter by appropriately varying the second (or third) parameter to induce a high overall system error rate, then measuring system error rate for each of a plurality of different values of the first parameter, and identifying the "optimal" value of the first parameter as the one resulting in the lowest overall system error rate. Finally, the process is repeated a third time to determine the optimal value of the third parameter by varying the first (or second) parameter to induce a high system error rate, and then measuring the overall system error rate for each of a plurality of values of the third parameter. Upon completion of this three stage process, the system controller sets each of the parameters PP, PC, and WC to its optimal value.

In one preferred embodiment, the parameter PP is first held fixed while the parameter WC is varied (to determine the optimum value of parameter WC). Then, the parameter WC is held fixed while PP is varied. Finally, the parameter WC (or PP) is held fixed while PS is varied. As explained above, special test patterns must be employed when WC is held fixed and PC varied (or when PC is held fixed and WC varied), or when PP is held fixed and PC is varied (or when PC is held fixed and PP is varied).

A desirable feature of the invention is that artificially high error rates may be induced by appropriately choosing the value of the parameter held fixed in each step of the inventive method. Thus, the inventive system need not be designed and operated so as to measure extremely low error rates with great accuracy. Instead the system need only be capable of measuring relatively high error rates.

Software for performing the inventive method may readily be generated by one of ordinary skill in the art of mass storage device memory system control, given the description of the inventive method provided herein.

We have also recognized that, in general, there will be a number of local minima in each error rate curve characterizing the inventive system. Thus, when one system error parameter (WC, PP, or PC) is held fixed and another is varied, a graph of the error rate as a function of the parameter being varied will not only have an absolute minimum, but will also have (in general) additional local minima. Thus, in a preferred embodiment of the invention, the varied parameter will be swept (or scanned) through its range to determine an appropriate system operating point near the absolute minimum. Thereafter, near such absolute minimum point, the above-described method steps will be performed to determine with precision the location of the absolute minimum. Accordingly, software for performing the inventive method will include such a preliminary sweeping (or scanning) step. Such software preferably may be readily generated by one of ordinary skill in the art, given the description of the inventive method provided herein.

A preferred embodiment of a circuit suitable for use as precompensation and pulse pairing compensation circuit 6' of the FIG. 4 system will now be described with reference to FIGS. 5 through 16.

Figure 5:
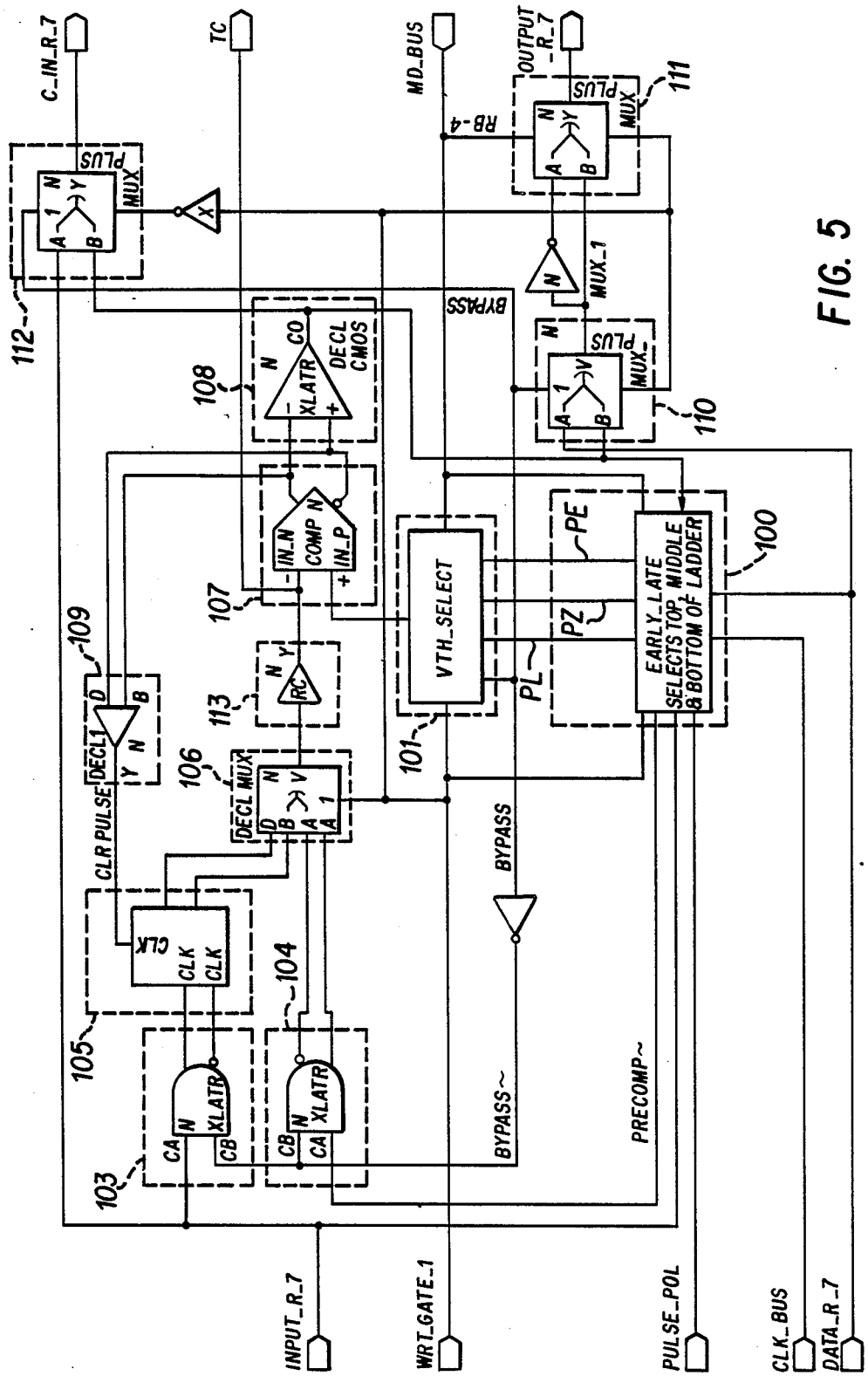
FIG. 5 is a diagram of a preferred embodiment of the inventive circuit for varying the pulse pairing and precompensation error parameters of a mass storage device memory system.

FIG. 5 is a block diagram of a preferred embodiment of circuit 6' of FIG. 4. Most components of the FIG. 5 circuit have a dual role in the sense that they are used to perform precompensation in the system's "write" mode and to perform pulse pairing compensation in the system's "read" mode. In the system's "write" mode, digital data in the 2,7 RLL format (the signal labeled "DATA 2 7") is received from encoder 10. The FIG. 5 circuit "precompensates" the data by recognizing sensitive bit patterns likely to exhibit bit repulsion and then for each sensitive pattern, delaying the early bits relative to the nominal bit delay, and writing the late bits early relative to the nominal bits. In the system's "read" mode, the FIG. 5 circuit performs pulse pairing compensation by recognizing the polarity of each incoming bit (i.e., the circuit recognizes whether the associated input pulse to pulse peak detector 5 shown in FIG. 4 had positive or negative polarity) and delaying each incoming bit by a preselected amount depending on its polarity.

The FIG. 5 circuit receives control signals from controller 9 that determine the circuit's operating mode ("write" or "read") and the amount by which each bit category be delayed. Controlling the amount of delay for each bit category is equivalent to controlling the PP and PC error parameters for the system.

The manner in which the FIG. 5 circuit operates in its "write" mode will first be described. If input signal "WRT GATE 1" from controller 9 is in a "high" voltage state, the FIG. 5 circuit will operate in the write mode. The incoming data signal "DATA 2 7" (2,7 RLL format data from encoder 10) is supplied to bypass multiplexer 110 which allows the data to proceed unprocessed to multiplexer 111 in response to certain control signals from controller 9 via WD-BUS indicating that no precompensation is to be performed. Signal DATA 2 7 is also supplied to "EARLY-LATE" circuit 100. Circuit 100 determines whether the next bit to be written should receive nominal compensation (delay), more than nominal delay, or less than nominal delay. Circuit 100 accordingly outputs a signal on the appropriate one of lines PE (pulse early), PZ (pulse nominal), or PL (pulse late). "VTH SELECT" circuit 101 receives such signal and outputs a corresponding one of three voltage values on line VT to ECOMP circuit 107. The three voltage values (voltage levels from a resistive ladder) represent late delay and early delay variations from a nominal delay, in addition to the nominal delay itself. The three voltage values are variable in response to signals received from controller 9 on the mode bus identified as "MD BUS."

Circuit 100 also outputs the bit to be precompensated and supplies it on line PRECOMP to circuit 104, which is a CMOS-to-ECL translator. The signal emerging from circuit 104 is then selected by DECL MUX circuit 106, and supplied to RC circuit 113. Circuit 113, upon receipt of the PRECOMP pulse from circuit 106, allows its output voltage to ramp down at a rate determined by an external resistor and capacitor and applies this ramp to the input of ECOMP circuit 107. When the ramp equals the selected voltage value received on line VT, circuit 107 will switch its outputs. These outputs (labeled "Comp High" and "Comp Lo") are supplied through translator 108, and the signal emerging from translator 108 is labeled "RC 2,7." The output of translator 108 is supplied through multiplexers 110 and 111 to become the output 2,7 RLL code ("OUTPUT 2 7") supplied to write driver 11 of FIG. 4. Thus, each bit in turn is delayed by a nominal amount, or by a preselected EARLY amount or a pre-selected LATE amount. The EARLY and LATE amounts are pre-selected by signals (to be discussed below with reference to FIG. 7) supplied from controller 9 via the MD BUS.

In the "read" mode of the FIG. 5 circuit, data is input from pulse detector 5 (shown in FIG. 4) on line "INPUT 2 7," and is supplied to bypass multiplexer 112, to EARLY LATE circuit 100, and to translator circuit 103. The function of translator 103 is to translate the voltage level to the ECL level required by flip-flop 105. The signal output from circuit 103 is supplied through flip-flop 105, DECLMUX circuit 106, and RC circuit 113 to ECOMP circuit 107. The function of circuit 105 is to terminate the pulse started by the leading edge of the signal "INPUT 2 7." The function of circuit 106 is to select WRT pulses from the other pulses emerging from circuits 104 and 105. A polarity signal ("PULSE POL") from pulse detector 5 is also supplied to EARLY LATE circuit 100.

In the read mode, circuit 100 determines the polarity associated with each incoming bit and accordingly outputs a signal on either line PE or line PZ to identify the bit as an early or late bit. The PE or PZ signal is supplied to VTH SELECT circuit 101, where a preselected voltage value is chosen (from a menu determined by control signals received from controller 9 on the MD BUS). The chosen voltage value (which corresponds to a pre-selected delay) is supplied to ECOMP circuit 107 as in the write mode. RC circuit 113 again provides a voltage ramp to comparator 107, and comparator 107 changes state when the ramp decreases to the VT voltage value chosen in circuit 101. The output pulse (labeled "RC 2 7") from comparator 107 goes through translator 108 and multiplexer 112 to synchronizer 7' via line "C IN 2 7." Output pulse "RC 2 7" is also supplied to EARLY LATE circuit 100 to update the polarity (for the next bit) by simply selecting the opposite polarity to that of the present bit. The output of circuit 107 is also supplied to buffer circuit 109. The function of circuit 109 is to buffer the signal from circuit 107. The output of circuit 109 is supplied to circuit 105 for the purpose of terminating the pulse started by the "INPUT 2 7" signal.

Figure 6:
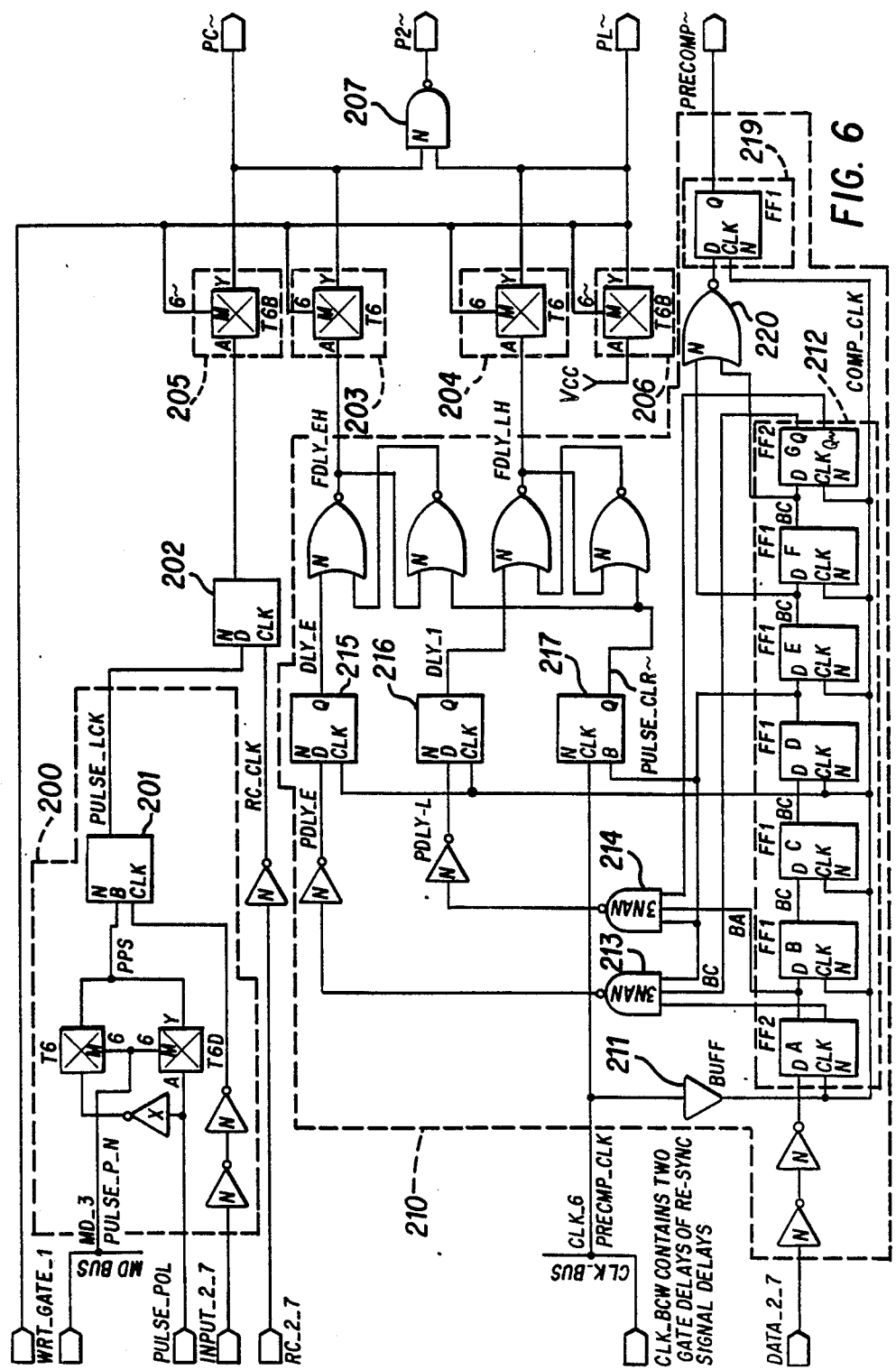
FIG. 6 is a diagram of the circuitry within block 100 of FIG. 5.

EARLY LATE circuit 100 is shown in FIG. 6. During the "read" mode, the circuitry within block 200 selects the pulse pairing compensation mode of operation for circuit 100 and selects the proper polarity for compensation. Signal MD3 arriving on the MD BUS instructs circuit 100 whether the positive polarity or the negative polarity incoming bits are to be delayed by a less than nominal amount. The nominal delay amount, and the "less than nominal" and "more than nominal" delay amounts are also set by signals, to be discussed below with reference to FIG. 6, arriving on the MD BUS. The "INPUT 2 7" data, delayed to produce "INX 2 7," clocks the polarity changes into flip-flop 201. The output of flip-flop 201 is the signal "PULSE LOCK," which is clocked into flip-flop 202 by the delayed "RC 2 7" signal, causing the output of circuit 202, signal "FDLY ER," to change after each delayed pulse. When in the "read" mode, signal WRT GATE will be a logical "not true" and thus will deselect transmission gates 203 and 204 and will select transmission gates 205 and 206. In this mode, PL will accordingly always be "high" (i.e., equal to +VCC) and PE and PZ will alternate according to FDLY ER via gate 205 and inverting NAND gate 207. This will alternately select EARLY and Nominal compensation for alternating ones of the bits comprising signal INPUT 2 7.

In the "write" mode, transmission gates 203 and 204 are activated (and gates 205 and 206 are deactivated) and the pulse pairing circuitry deactivated by signal WRT GATE 1. The precompensation circuitry within block 210 accepts data signal DATA 2 7, and clocks this signal into seven-bit shift register 212 with delayed clock signal PRECOMP CLK. Clock signals "CLK G" to be discussed below, and PRECOMP CLK arrive on the CLK BUS from encoder 10. PRECOMP CLK is then delayed in buffer 211. The state of shift register outputs A through G is monitored by three-input NAND gates 213 and 214 and flip-flops 215, 216 and 217. Flip-flop 217 outputs a "one" whenever a "one" (the bit to be compensated) appears at position D. This "one" at the output of circuit 217 enables latches FDLY EH and FDLY LH. The relationships of signals PDLY E, PDLY L, and PULSE CLR to the state of shift register 212's outputs is shown in the following table:

| A | B | C | D | E | F | G | PDLY E | PDLY I | PULSE CLR |
|---|---|---|---|---|---|---|--------|--------|-----------|
| x | x | x | 0 | x | x | x | 0      | 0      | 0         |
| 0 | 0 | 0 | 1 | 0 | 0 | 0 | 0      | 0      | 1         |
| 1 | 0 | 0 | 1 | 0 | 0 | 0 | 0      | 1      | 0         |
| 0 | 0 | 0 | 1 | 0 | 0 | 1 | 1      | 0      | 0         |
| 1 | 0 | 0 | 1 | 0 | 0 | 1 | 0      | 0      | 1         |

The PDLY E signal will be a "one" if bit G is a "one" and if bit A is a zero when D is a "one"; otherwise PDLY E will be "zero". PDLY L will be a "one" if bit A is a "one" and bit G is a zero when D is a "one"; otherwise PDLY L will be a "zero". Pulse CLR is zero whenever bit D is zero allowing the latches to hold the set values until the next "one," which will enable them to change.

Flip-flop 219 provides a pulse starting at the clock pulse after the clock pulse that positioned the "one" in position D. The pulse output by circuit 219 has duration equal to two clock periods due to the presence of NOR gate 220 between gates E and F and circuit 219. The PRECOMP signal emerging from circuit 219 is supplied to translator 104 as shown in FIG. 5.

The precompensation scheme of FIGS. 5 and 6 thus compensates a bit when the bit is preceded by the sequence "zero zero one" and followed by three or more "zeroes," and when the bit is followed by the sequence "one zero zero" and preceded by three or more "zeroes." No compensation is performed when there are three or more "zeroes" preceding and following the bit, and no compensation is performed when there are two "zeroes" and a "one" both preceding and following the bit. The rationale behind this scheme is that a first bit will be repelled by the near presence of an adjacent second bit unless there are bits in close proximity to the first bit on both sides of the first bit. For a bit sequence "zero zero zero one zero zero one zero zero one zero zero zero", the first "one" will be written late (closer to the middle "one"), the middle "one" will not be compensated, and the third "one" will be written early.

Figure 7:
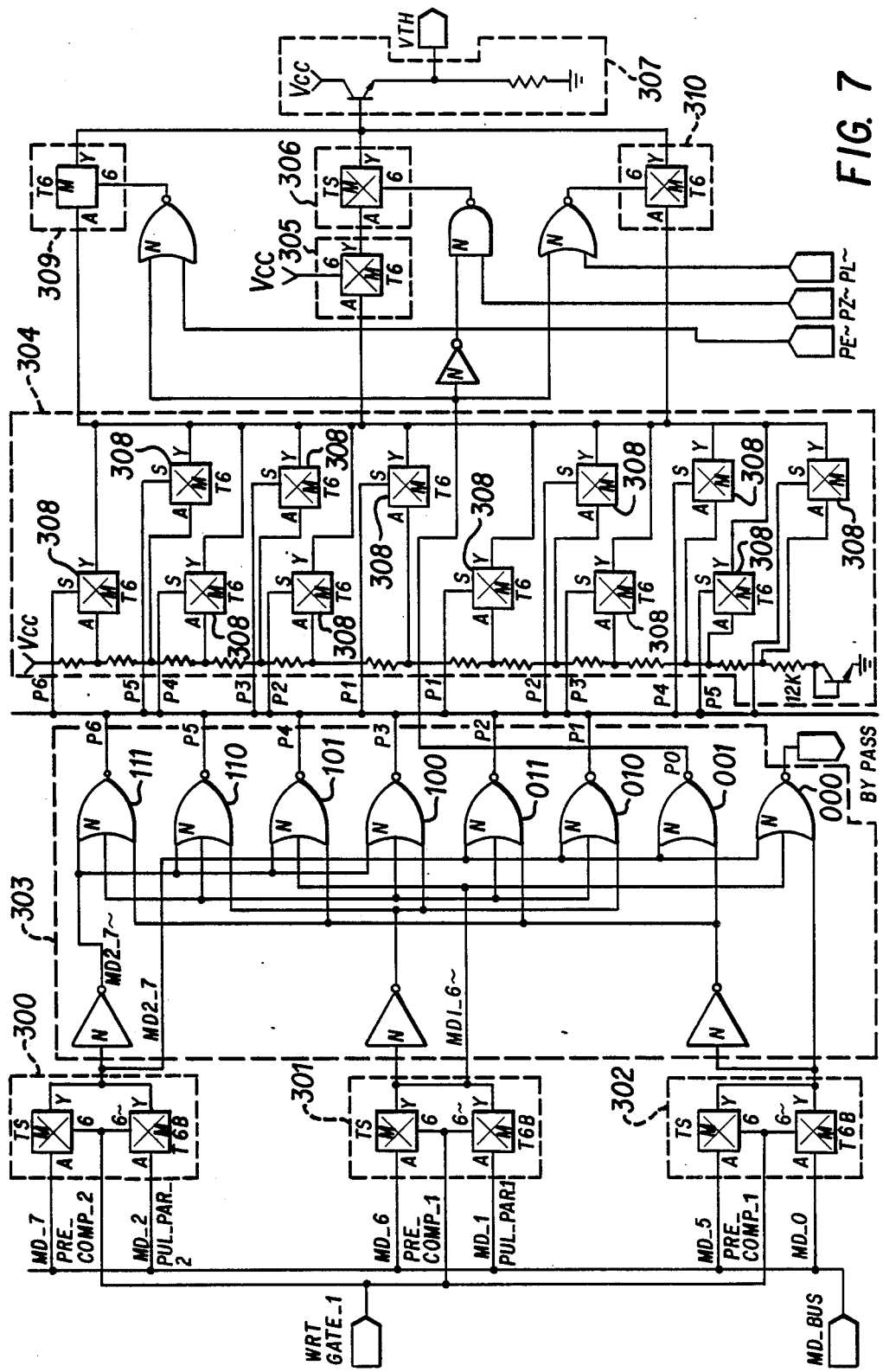
FIG. 7 is a diagram of the circuitry within block 101 of FIG. 5.

FIG. 7 shows VTH SELECT circuit 101 of FIG. 4. Circuit 101 receives signals MD 0, MD 1, and MD 2 (for pulse pairing compensation) and signals MD 5, MD 6, and MD 7 (for precompensation) on the MD BUS. Circuit 101 also receives signal WRT GATE 1, and supplies WRT GATE 1 to transmission gate pairs 300, 301, and 302. In the "write" mode, circuits 300, 301, and 302 will supply signals MD 5, MD 6, and MD 7 to decoder circuit 303. In the "read" mode, circuits 300, 301, and 302 will supply signals MD 0, MD 1, and MD 2 to circuit 303. The input signals to circuit 303 are decoded to select one of signals P0 through P6, or "BYPASS." If the output of circuit 303 is selected to be BYPASS, then the FIG. 5 circuit will not perform precompensation on incoming signal DATA 2 7. If the output of circuit 303 is P0, the output of circuit 101 (VTH) is supplied from the center of resistor string 304 via transmission gates 305 and 306 and output emitter follower 307. This path is also selected whenever signal PZ from circuit 100 is in a "true" state, regardless of the MD bit status.

If the MD bits (MD 0 through MD 7) select other than BYPASS or P0 (i.e., if they select one of signals PI through P6), then an EARLY value is selected from the upper bank of resistors in string 304, and a LATE value is selected from the lower bank of resistors in string 304, by selecting the appropriate ones of transmission gates 308. These EARLY and LATE voltages are supplied to transmission gates 309 and 310, respectively, which are selected by PE and PL when PO is in a "not true" state. The logic of EARLY LATE circuit 100 ensures that signals PE, PZ, and PL are mutually exclusive.

Figure 8:
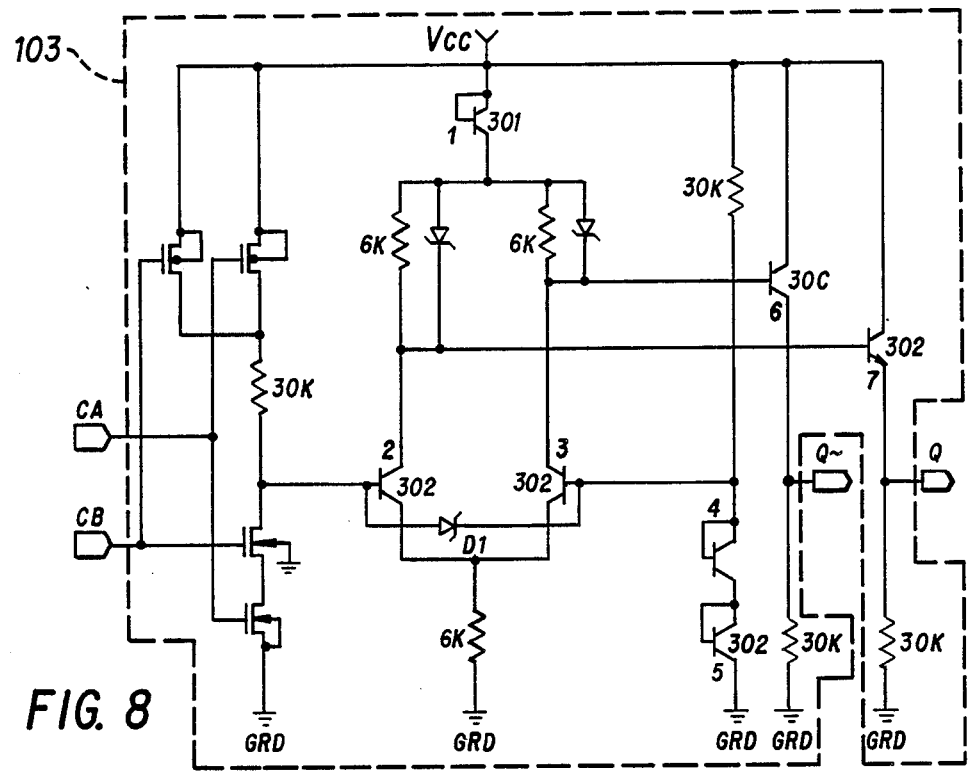
FIG. 8 is a diagram of the circuitry within block 103 of FIG. 5.
Figure 9:
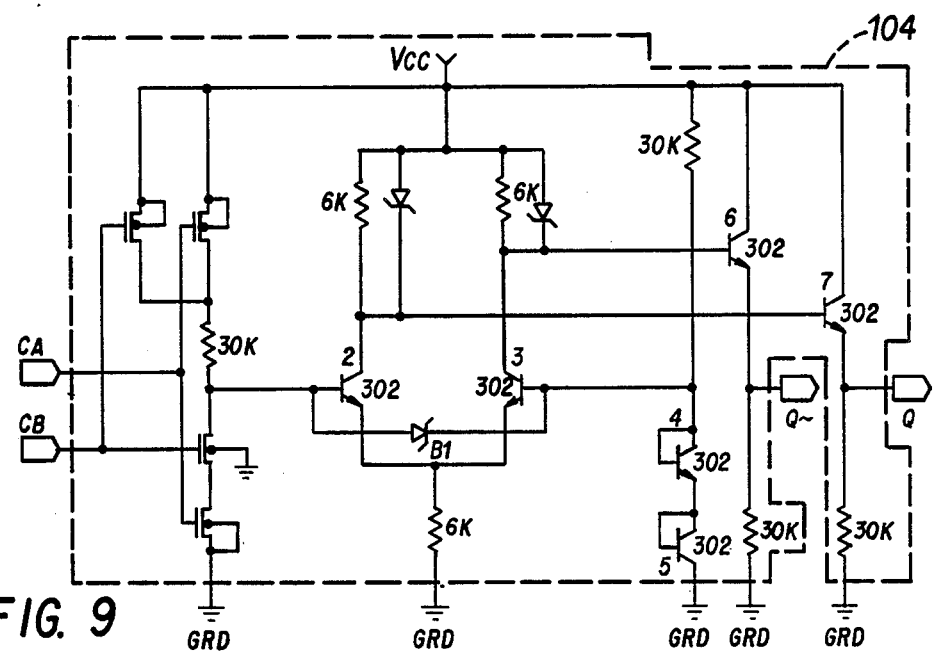
FIG. 9 is a diagram of the circuitry within block 104 of FIG. 5.
Figure 10:
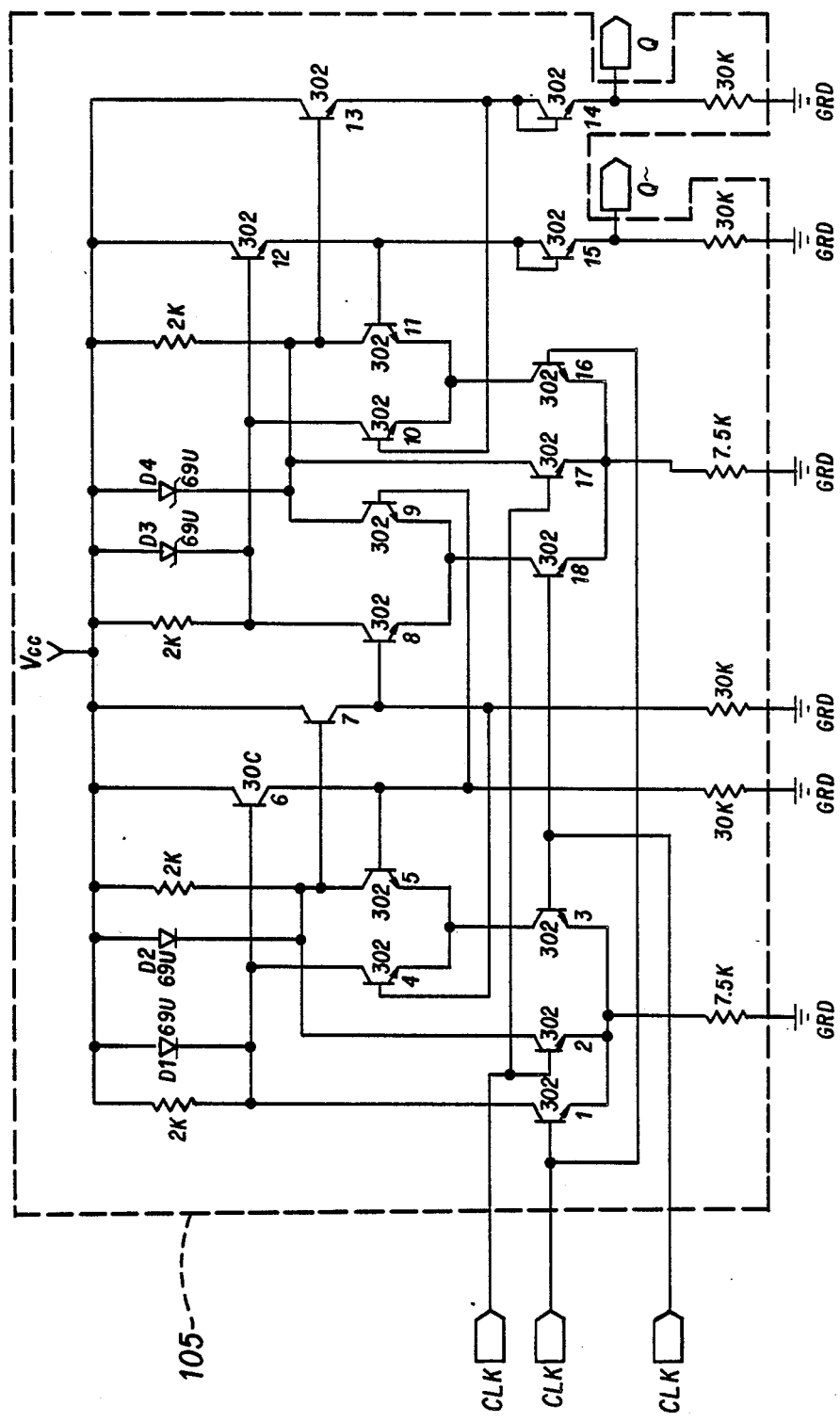
FIG. 10 is a diagram of the circuitry within block 105 of FIG. 5.
Figure 11:
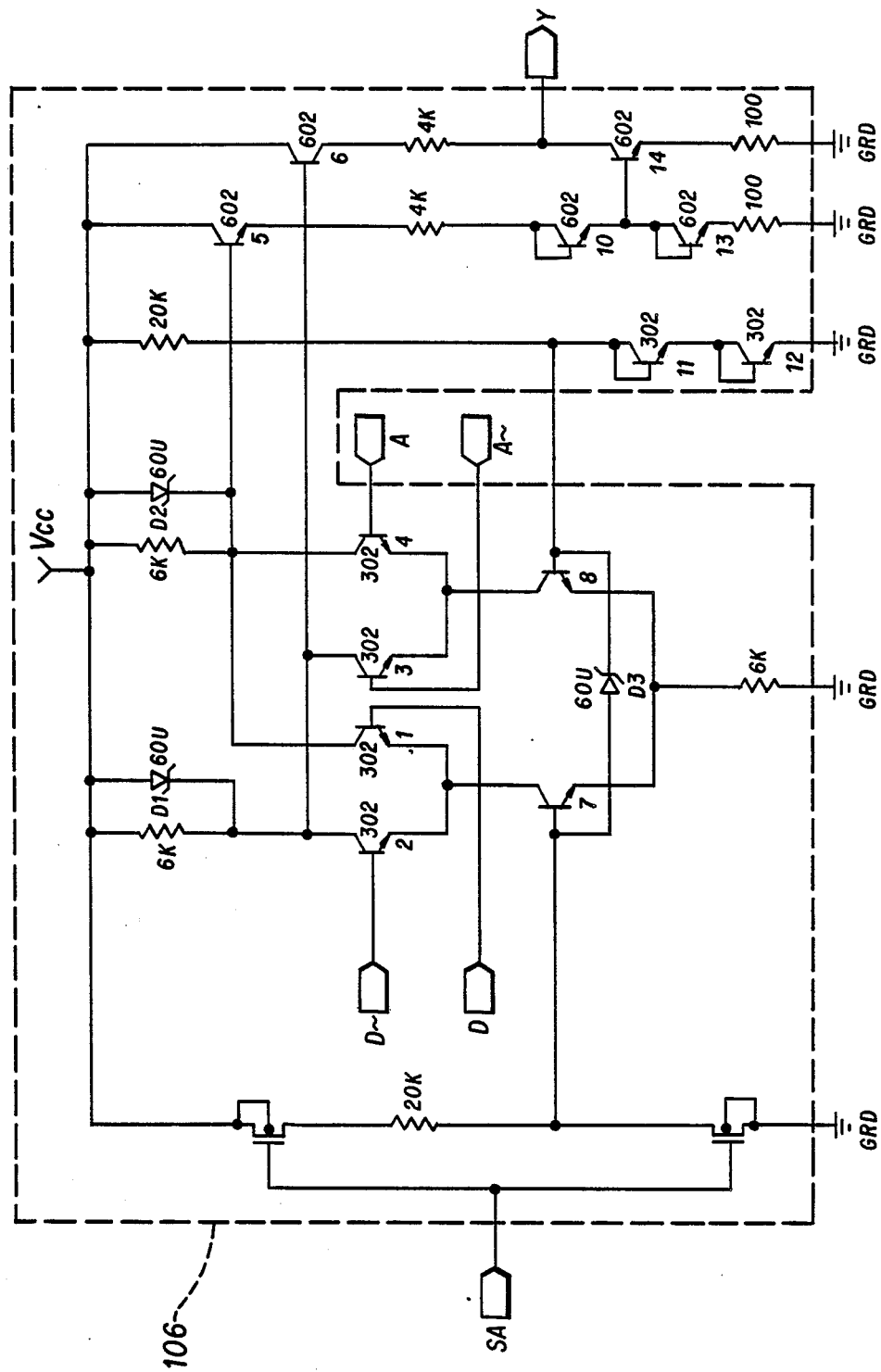
FIG. 11 is a diagram of the circuitry within block 106 of FIG. 5.
Figure 12:
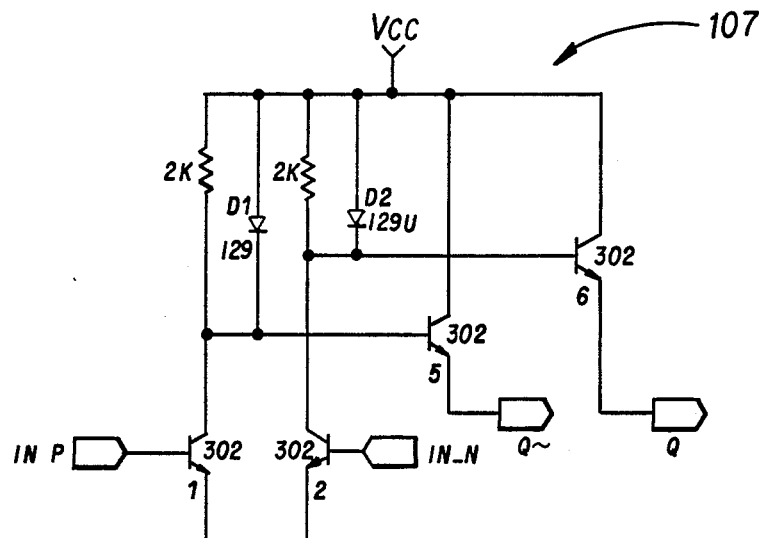
FIG. 12 is a diagram of the circuitry within block 107 of FIG. 5.
Figure 13:
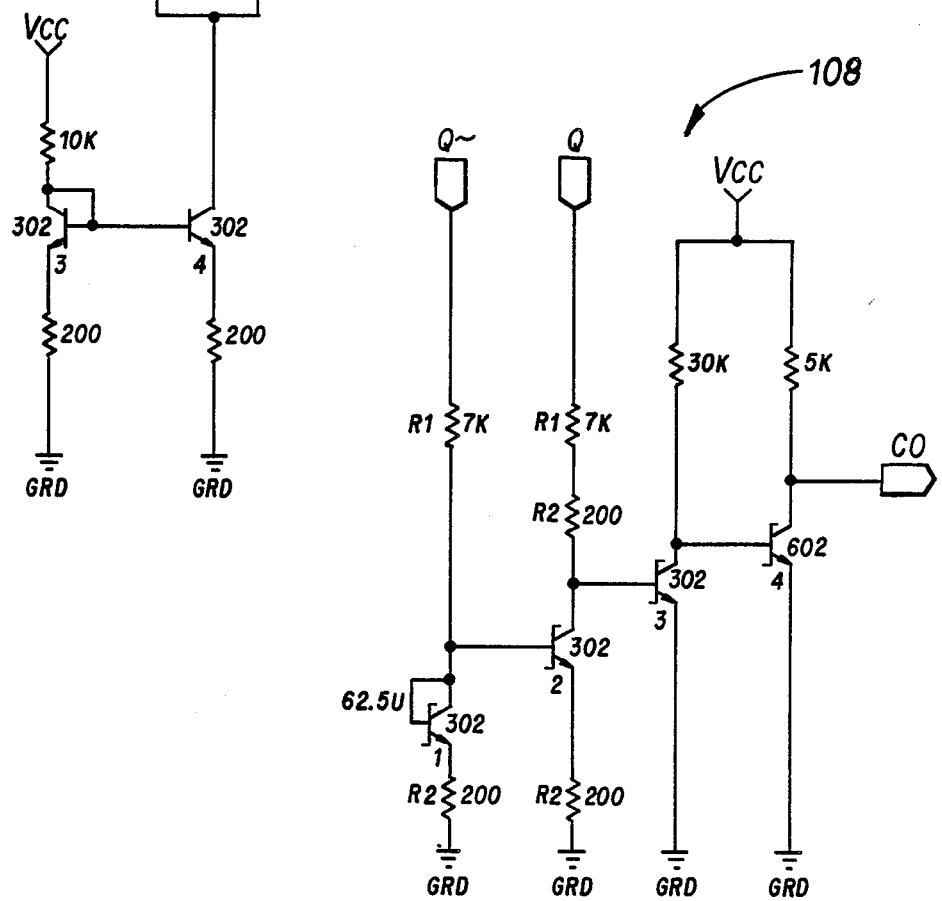
FIG. 13 is a diagram of the circuitry within block 108 of FIG. 5.
Figure 15:
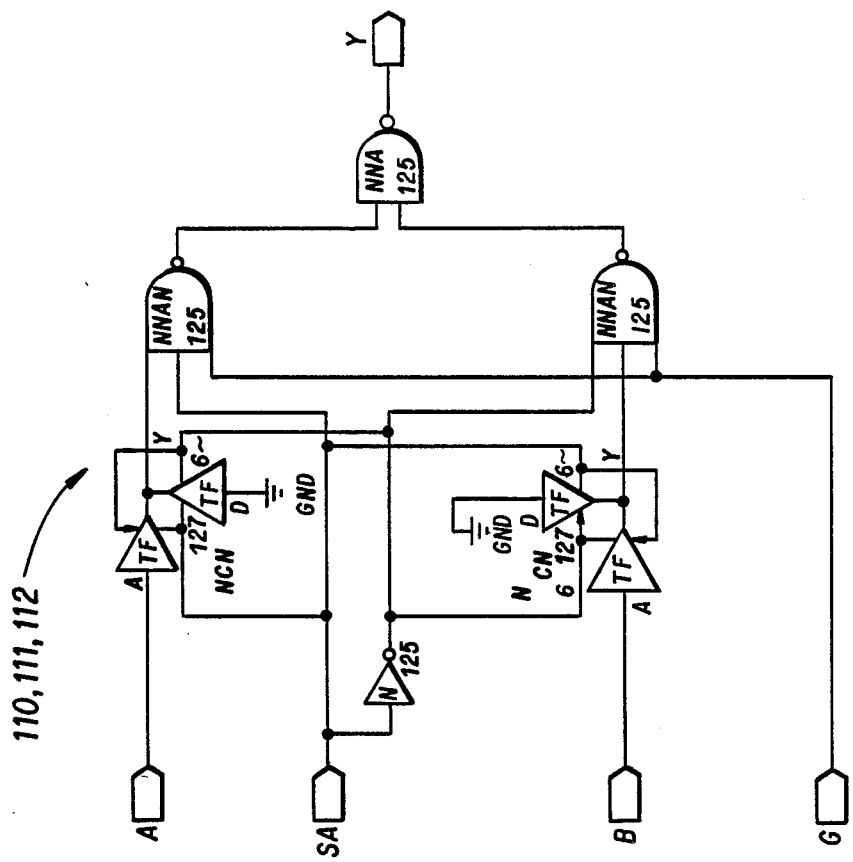
FIG. 15 is a diagram of the circuitry within block 110, 111, or 112 of FIG. 5
Figure 14:
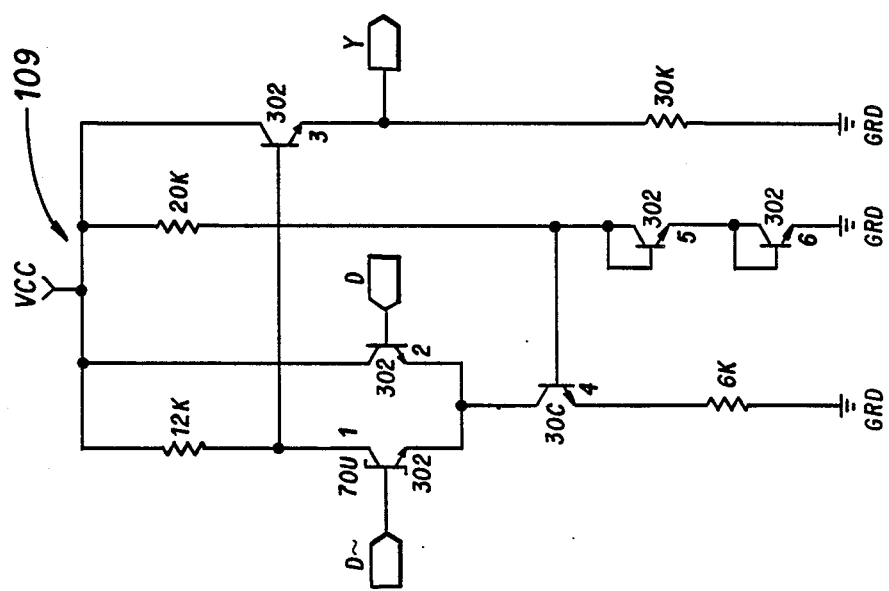
FIG. 14 is a diagram of the circuitry within block 109 of FIG. 5.
Figure 16:
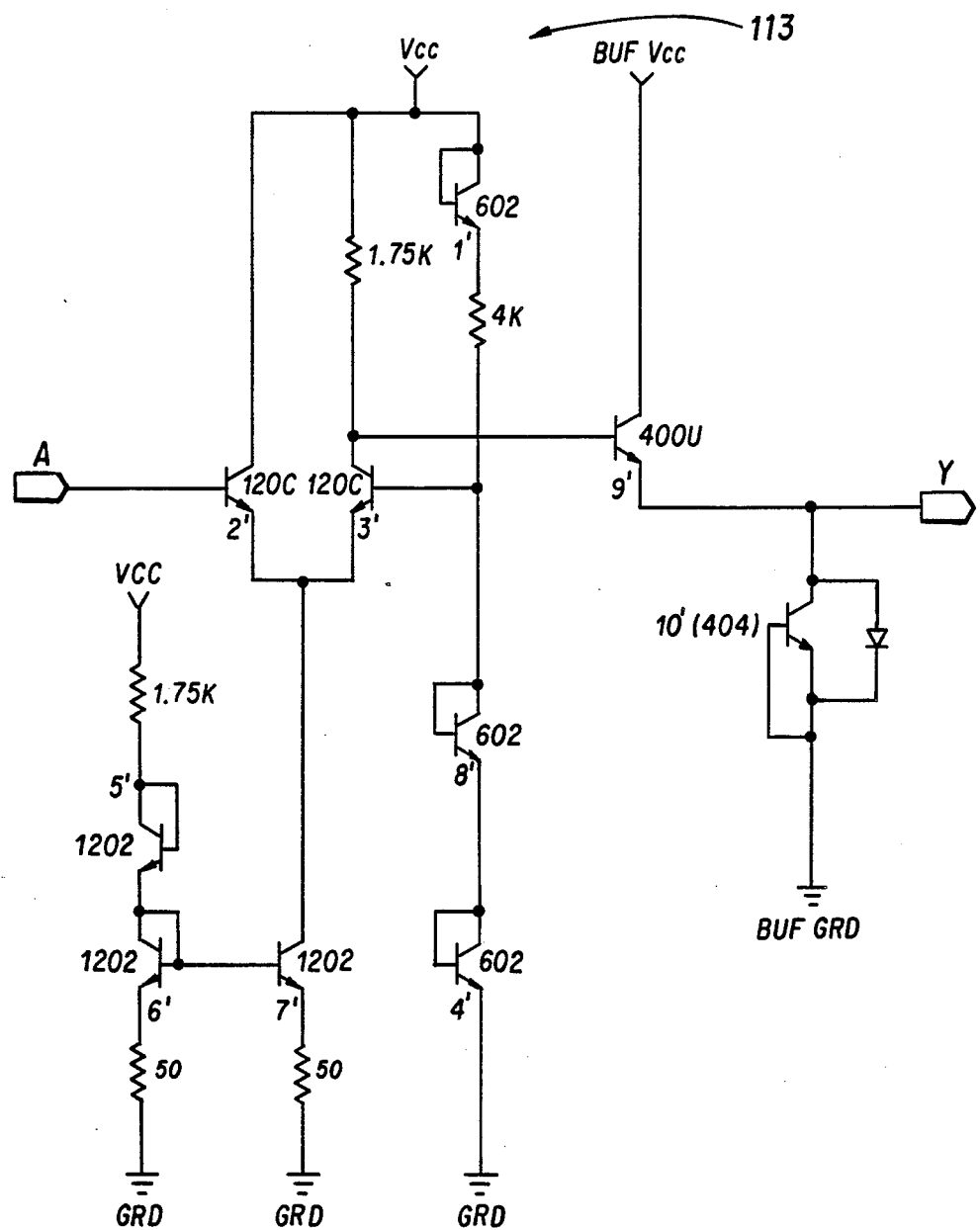
FIG. 16 is a diagram of the circuitry within block 113 of FIG. 5.

Preferred embodiments of the remaining blocks of FIG. 5 are shown in FIGS. 8 through 16. FIG. 8 is a preferred embodiment of circuit 103 of FIG. 5. FIG. 9 is a preferred embodiment of circuit 104 of FIG. 5. FIG. 10 is a preferred embodiment of circuit 105 of FIG. 5. FIG. 11 is a preferred embodiment of circuit 106 of FIG. 5. FIG. 12 is a preferred embodiment of circuit 107 of FIG. 5. FIG. 13 is a preferred embodiment of circuit 108 of FIG. 5. It is important that resistors M1 in circuit 108 match (i.e., they must have identical dimensions and orientation). Similarly, resistors M2 in circuit 108 must match. FIG. 14 is a preferred embodiment of circuit 109 of FIG. 5. FIG. 15 is a preferred embodiment of identical circuits 110, 111, and 112 of FIG. 5. FIG. 16 is a preferred embodiment of circuit 113 of FIG. 5. It is important that the collector of transistor 9' of FIG. 16 be connected directly to the VCC pad to prevent switching currents from upsetting other internal circuitry.

Figure 17:
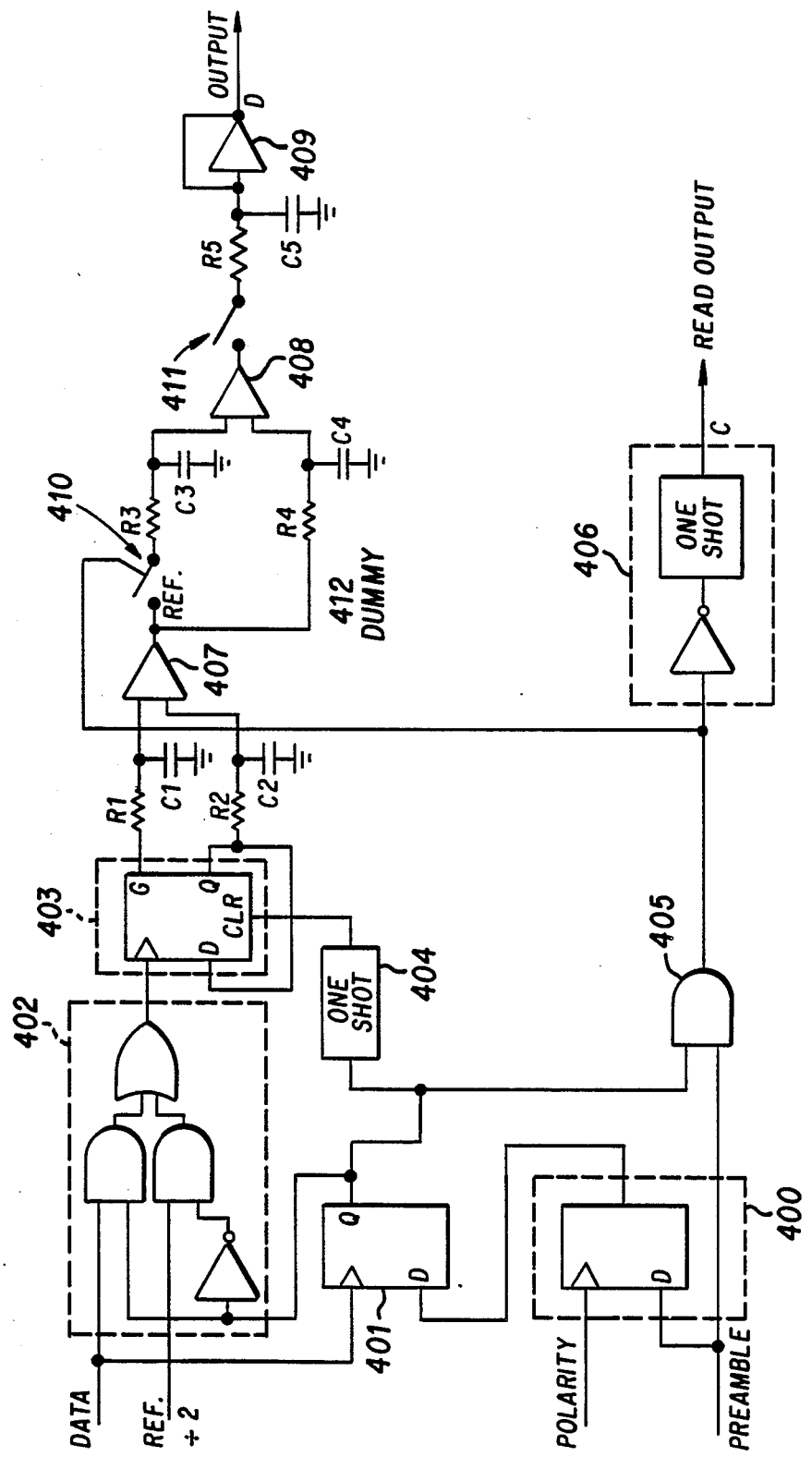
FIG. 17 is a diagram of an alternative circuit for measuring pulse pairing error in the inventive system.

In an alternative embodiment of the inventive system, pulse pairing may be measured, and pulse pairing compensation performed, using circuitry separate from the precompensation circuitry. For example, either operation may be accomplished in pulse detector 5 of FIG. 4. FIG. 17 is an example of such a circuit that may be included in pulse detector 5 for measuring the magnitude of pulse pairing error in a stream of data read from a mass storage device memory system. A "Polarity" signal (indicative of the polarity associated with each incoming data pulse) is supplied to the clock input of flip-flop 400, and a "Preamble" signal indicative of reading a preamble field of a fixed frequency or spacing is supplied to the data input of flip-flop 400. The output of flip-flop 400, and the incoming data stream (the "Data" signal) are supplied to flip-flop 401. The output of 401 goes to multiplexer 402. The output of 402 is the Reference "IF" frequency until the first Data pulse, related to a "positive" Read pulse, following the assertion of PREAMBLE (at which time the output of 402 becomes the Data stream).

The output of flip-flop 401 also activates one-shot 404. The output of circuit 404 clears flip-flop 403 thereby ensuring the same initial conditions for each reading. The output of flip-flop 401 also goes to one input terminal of AND gate 405. The output of 405 will be true at the delayed PREAMBLE from flip-flop 401 and will go false at the end of PREAMBLE. The output of AND gate 405 will open switch 410 during this shortened PREAMBLE and at the end of this shortened PREAMBLE will activate one-shot 406 which will open switch 411 for the period of time set by one-shot 406. The output of one-shot 406 will establish a "READ OUTPUT" time window. Flip-flop 403 when driven by "Reference +2" during NONPREAMBLE time, will alternately assert Q and $\bar{Q}$ for equal times deviating only by any unequal delays of itself (flip-flop 403). Resistor R1 will charge capacitor C1, ideally to $V_{Low}+(V_{High}-V_{Low})/2$ assuming a perfect match of Q time and $\bar{Q}$. Resistor R2 will charge capacitor C2 to the same value related to $\bar{Q}$. The difference of the voltages on capacitors C1 and C2 will be amplified by difference amplifier 407 and applied to capacitors C3 and C4 via resistors R3 and R4 and switches 410 and 412. The voltages on capacitors C3 and C4 will be identical at this time. During the qualified PREAMBLE the Data will be the recovered signal from a constant frequency pattern approximately equal to Reference ÷2 and will include any inherent pulse pairing. Flip-flop 403's outputs will change their time relationship to include the pulse pairing which will result in different charges on C1 and C2. This difference, again, is amplified by 407. When switch 410 has been opened, C3 will store the initial balanced condition while C4 will charge to the new value containing the pulse-pairing information. Differential amplifier 408 will amplify this difference and apply it to buffer amplifier 409 via switch 411 and resistor R5. The input to amplifier 409 is filtered by capacitor C5. Output D from amplifier 409 will then represent only the pulse pairing (T1-T2) of the Data signal. At the end of PREAMBLE, switch 411 will open and the output signal D may then be read by conventional means.

The output of multiplexer 402 is supplied to the clock input of flip-flop 403. The voltage at point D is thus proportional to the quantity T1−T2, where T1 is the time delay between a positive polarity data pulse and the nearest subsequent negative polarity data pulse, and T2 is the time delay between a negative polarity data pulse and the dearest subsequent negative polarity data pulse. Accordingly, voltage signal D is an error signal indicative of the magnitude of pulse pairing error. Signal D may be used to generate control signals for a circuit such as that shown in FIG. 18 to vary the difference, T1−T2, between the two delays as desired, for example to compensate for the effect of pulse pairing. Signal D may alternatively be read by an analog to digital converter and subsequently held in logic, such as in controller 9, where it may be used to generate a PP error parameter, and to generate control signals (such as MD 0, MD 1, and MD 2 discussed above) for compensating for the pulse pairing error.

Figure 18:
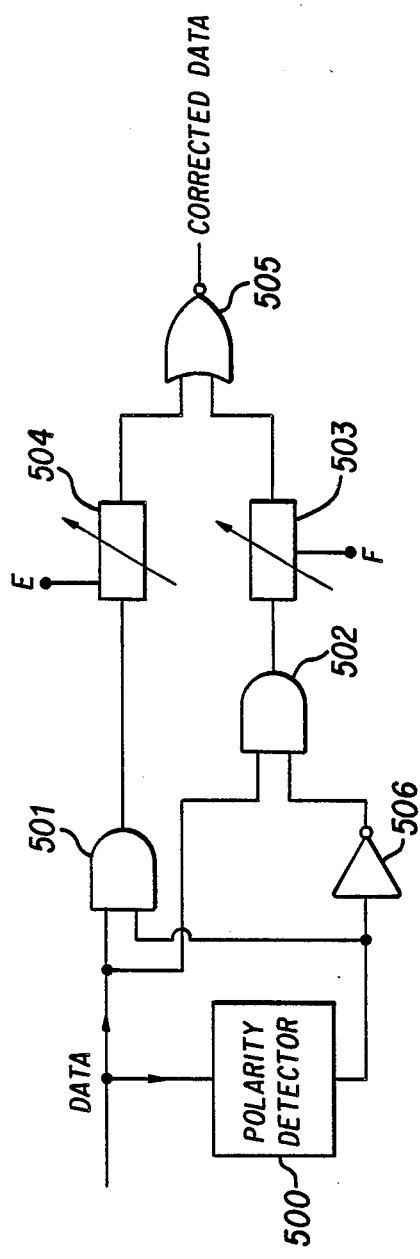
FIG. 18 is a circuit for performing pulse pairing error compensation, of the type that may be used with FIG. 17 circuit.

FIG. 18 is a circuit for performing pulse pairing error compensation on a stream of data read from a mass storage device memory system. The data is supplied to an input of each of AND gates 501 and 502, and to polarity detector circuit 500. Circuit 500 outputs a signal indicative of the polarity associated with each pulse of the incoming data stream to the other input of each of AND gates 501 and 502. Variable delay lines 504 and 503 are independently controllable in response to control signals E and F, respectively. The compensated data emerges from NOR gate 505. Each of delay lines 503 and 504 may be a silicon delay line such as employed in National Semiconductor Corporation's "DP845" integrated circuit. The output signal D from the FIG. 17 circuit may be used to generate control signals E and F as described in the previous paragraph.

The foregoing is merely illustrative and explanatory of the inventive method and system. Various changes in the details of the system method described above may be within the scope of the appended claims.

What is claimed is:

1. A method for determining an optimal value of at least one error parameter in a set consisting of a pulse pairing error parameter, a pattern sensitivity error parameter, and a window centering error parameter of a mass storage device memory system, including the steps of:
   (a) setting a first parameter in the set to a fixed value inducing a high system error rate; and
   (b) after step (a), varying a second parameter in the set to determine the optimal value of said second parameter.

2. The method of claim 1, also including the step of: tuning the system so that the system's second error parameter is optimal.

3. The method of claim 1, also including the steps of:
   (c) setting the second parameter to a fixed value inducing a high system error rate; and
   (d) after step (c), varying a third parameter in the set to determine the optimal value of said third parameter.

4. The method of claim 3, also including the step of: tuning the system so that the system's third error parameter is optimal.

5. The method of claim 1, also including the steps of:
   (e) setting the third parameter to a fixed value inducing a high system error rate; and
   (f) after step (e), varying the first parameter to determine the optimal value of the said first parameter.

6. The method of claim 5, also including the step of tuning the system so that the system's first parameter is optimal.

7. The method of claim 1, also including the steps of:

(g) setting the second parameter to a fixed value inducing a high system error rate; and
(h) after step (g), varying the first parameter to determine the optimal value of said first parameter.

8. The method of claim 1, wherein the third parameter is the window centering error parameter, and wherein step (b) includes the step of:
reading a test pattern from the mass storage device memory system, where the test pattern is an unlocked pattern satisfying the criterion that $p_a > p_0$, where $p_a$ is the average system error rate during performance of step (b), and p0 is said high system error rate.

9. The method of claim 1, wherein the system is a magnetic disk drive system.

10. The method of claim 9, wherein the magnetic disk drive system includes at least two read/write heads, and the third parameter is the window centering error parameter, and steps (a) and (b) are performed repeatedly, once for each read/write head.

11. A method for reducing the error rate of a mass storage device memory system, including the steps of:
(a) inducing a high system error rate by setting a first system error parameter selected from a set consisting of a window centering error parameter, a pulse pairing error parameter, and a pattern sensitivity error parameter, to a fixed value;
(b) varying a second system error parameter selected from the set while monitoring the system error rate to determine an optimal value of said second system error parameter; and
(c) tuning the system so that the second system error parameter is at its optimal value.

12. The method of claim 11, also including the steps of:
(d) inducing a high system error rate by setting the second system error parameter to a fixed value;
(e) varying a third system error parameter selected from the set while monitoring the system error rate to determine the optimal value of said third system error parameter; and
(c) tuning the system so that the third system error parameter is at its optimal value.

13. The method of claim 11, wherein the system is a magnetic disk drive system.

14. The method of claim 13, wherein the magnetic disk drive system includes at least two read/write heads, and the second system error parameter is the pulse pairing error parameter, and steps (b) and (c) are performed repeatedly, once for each read/write head.

15. The method of claim 13, wherein the magnetic disk drive system includes at least two read/write heads, and the second system error parameter is the pattern sensitivity error parameter, and steps (b) and (c) are performed repeatedly, once for each read/write head.

16. A mass storage device memory system, capable of operating in a read mode to read data from a memory and in a write mode to write data into the memory, and including:
(a) means for varying a pulse pairing error parameter characterizing the system;
(b) means for varying a pattern sensitivity error parameter characterizing the system; and
(c) means for determining the system error rate associated with each system configuration in which each of said error parameters has a value determined by means (a) and means (b).

17. The system of claim 16, also including:
(d) means for varying a window centering error parameter characterizing the system.

18. The system of claim 17, also including means for tuning the system so that each of said error parameters is at its optimal value.

19. The system of claim 16, also including means for reducing the system error rate by setting at least one of said error parameters at its optimal value.

20. The system of claim 16, wherein element (a) includes:
means for identifying the polarity associated with each pulse of data read from the memory;
means for delaying each said pulse associated with positive polarity by a first variable delay amount;
means for varying the first delay amount;
means for delaying each said pulse associated with negative polarity by a second variable delay amount; and
means for varying the second delay amount.

21. The system of claim 16, wherein element (b) includes:
means for identifying a first set of data pulses to be written into the memory which require precompensation, and a second set of data pulses to be written into memory which do not require precompensation;
means for delaying each pulse in the second set by a nominal delay amount; and
means for performing precompensation on each pulse in the first set.

22. The system of claim 21, wherein element (b) also includes:
means for identifying a first subset of late pulses in the first set and a second subset of early pulses in the first set;
means for delaying each pulse in the first subset by a first delay amount less than a nominal delay amount; and
means for delaying each pulse in the first sunset by a second delay amount greater than the nominal delay amount.

23. The system of claim 22, also including a system controller in electrical communication with element (b), and wherein the nominal delay amount and the first and second delay amounts are variable in response to control signals supplied by the system controller.

24. The system of claim 16 or 23, wherein the memory is a magnetic disk.

25. A mass storage device memory system, capable of being operated in a read mode to read data from a memory and in a write mode to write data into the memory, and including:
(a) a first read/write head;
(b) a second read/write head;
(c) a synchronizer for alternately synchronizing data that has been read from the memory by the first head and by the second head, said synchronizer being characterized by a window centering error parameter;
(d) means for varying a pulse pairing error parameter characterizing the system;
(e) means for varying a pattern sensitivity error parameter characterizing the system; and
(f) means for determining the system error rate associated with each system configuration characterized by a value for each of said error parameters.

26. The system of claim 25, wherein element (d) includes:
   means for varying a pulse pairing error parameter characterizing a first portion of the system excluding the first head; and
   means for varying a pulse pairing error parameter characterizing a second portion of the system excluding the second head.

27. The system of claim 25, wherein element (e) includes:
   means for varying a pattern sensitivity error parameter characterizing a first portion of the system excluding the first head; and
   means for varying a precompensation error parameter characterizing a second portion of the system excluding the second head.

28. The system of claim 25, also including means for reducing the system error rate by setting at least one of said error parameters at its optimal value.

29. The system of claim 25, also including means for tuning the system so that each of said error parameters is at its optimal value.

30. The system of claim 25, wherein element (d) includes:
   means for identifying the polarity associated with each pulse of data read from the memory;
   means for delaying each said pulse associated with positive polarity by a first variable delay amount;
   means for varying the first delay amount;
   means for delaying each said pulse associated with negative polarity by a second variable delay amount; and
   means for varying the second delay amount.

31. The system of claim 25, wherein element (e) includes:
   means for identifying a first set of data pulses to be written into the memory which require precompensation, and a second set of data pulses to be written into memory which do not require precompensation;
   means for delaying each pulse in the second set by a nominal delay amount; and
   means for performing precompensation on each pulse in the first set.

32. The system of claim 31, wherein element (e) also includes:
   means for identifying a first subset of late pulses in the first set and a second subset of early pulses in the first set;
   means for delaying each pulse in the first subset by a first delay amount less than the nominal delay amount; and
   means for delaying each pulse in the first subset by a second delay amount greater than the nominal delay amount.

33. The system of claim 32, also including a system controller in electrical communication with element (e), and wherein the nominal delay amount and the first and second delay amounts are variable in response to control signals supplied by the system controller.

34. The system of claim 25 or 33, wherein the mass storage device memory system is a magnetic disk drive system.

* * * * *